(12) United States Patent
Bittner

(10) Patent No.: US 6,571,064 B1
(45) Date of Patent: May 27, 2003

(54) LED REFLECTOR DEVICE

(75) Inventor: Wilfried Bittner, Hong Kong (CN)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/016,646

(22) Filed: Dec. 17, 2001

(51) Int. Cl.[7] .............................................. G03B 17/20
(52) U.S. Cl. ...................................... 396/296; 396/385
(58) Field of Search ................................. 396/296, 281, 396/373, 385

(56) References Cited

U.S. PATENT DOCUMENTS

| | | | | |
|---|---|---|---|---|
| 3,120,791 A | * | 2/1964 | Bundschuh et al. | 396/201 |
| 3,416,422 A | * | 12/1968 | Dietrich et al. | 396/202 |
| 3,687,038 A | * | 8/1972 | Kawakami | 359/834 |
| 4,172,651 A | * | 10/1979 | Wiessner et al. | 396/238 |
| 4,206,991 A | * | 6/1980 | Kobori et al. | 359/836 |
| 4,381,145 A | * | 4/1983 | Momiyama et al. | 396/281 |
| 5,173,726 A | * | 12/1992 | Burnham et al. | 396/149 |
| 5,519,496 A | * | 5/1996 | Borgert et al. | 348/126 |

* cited by examiner

*Primary Examiner*—David M. Gray
*Assistant Examiner*—Michelle Nguyen
(74) *Attorney, Agent, or Firm*—Scott L. Lampert; Kerry P. Sisselman

(57) ABSTRACT

A camera viewfinder reflector for directing light from an indicator outside the line-of-sight of the viewfinder into the viewfinder is provided. The reflector may be combined with an existing element of the camera assembly, such as a leaf spring, or may comprise a separate, distinct reflector component. Light from an indicator on the pc-board of the camera is reflected from a portion of the reflector that is located in the viewfinder at the periphery of the viewfinder lens assembly in fixed optical alignment with the ocular lens of the viewfinder.

26 Claims, 16 Drawing Sheets

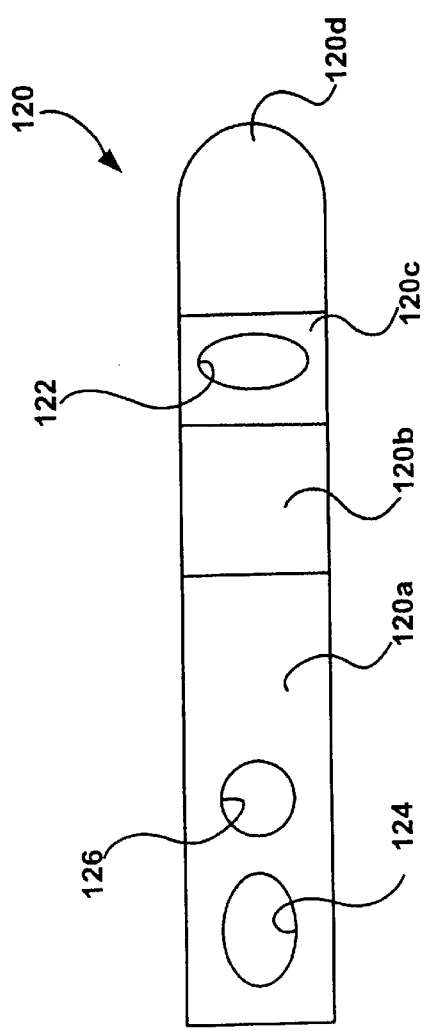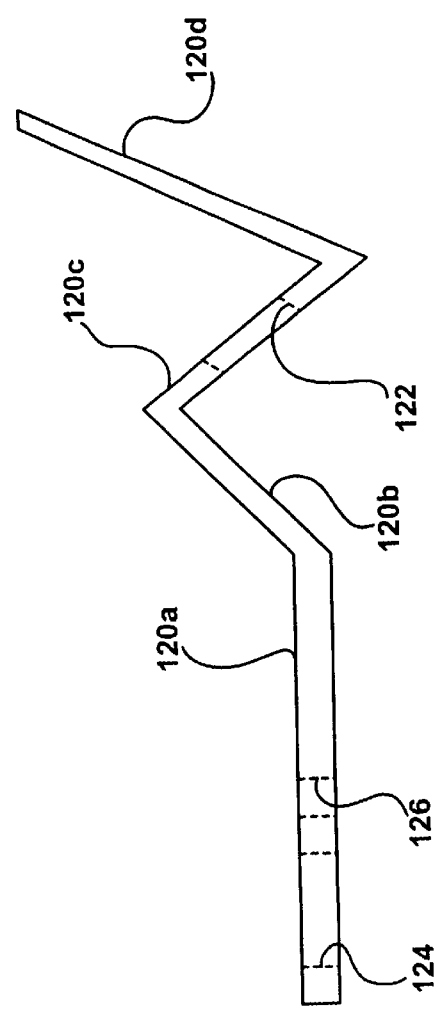

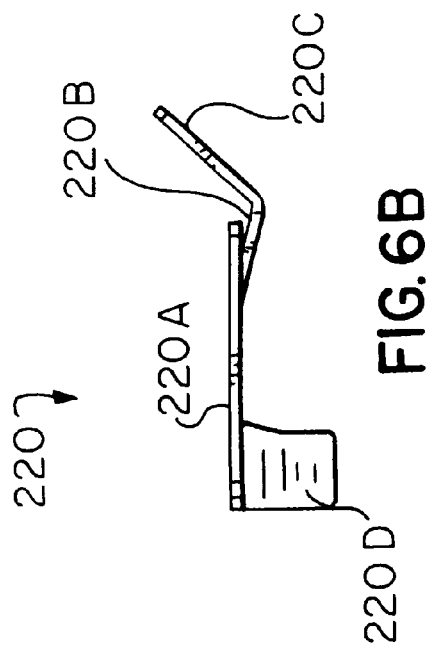
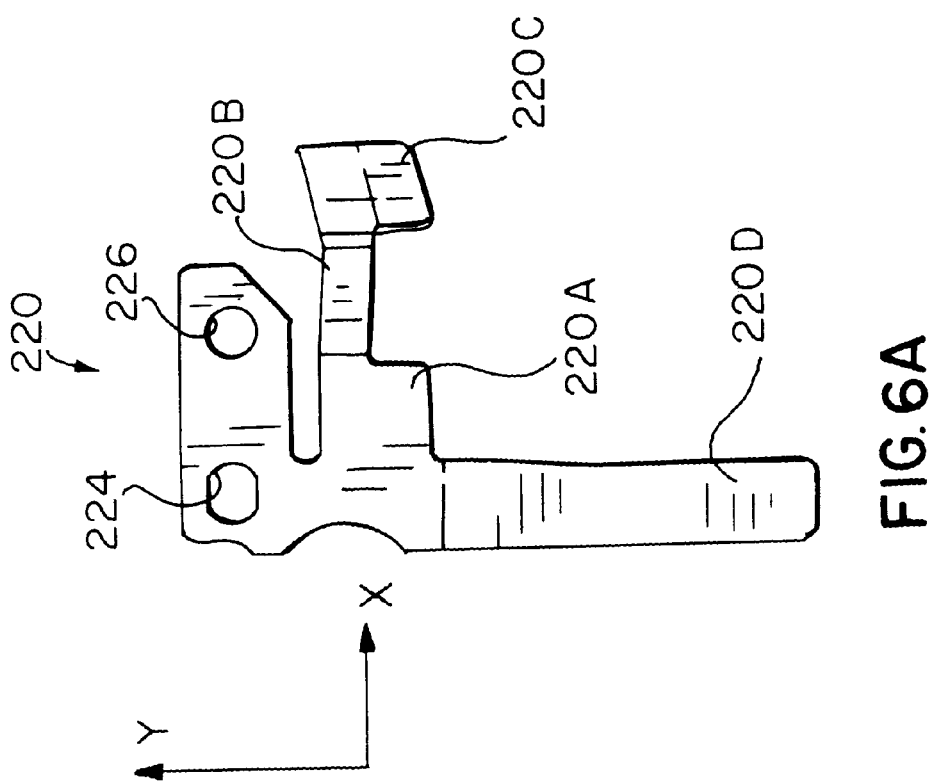

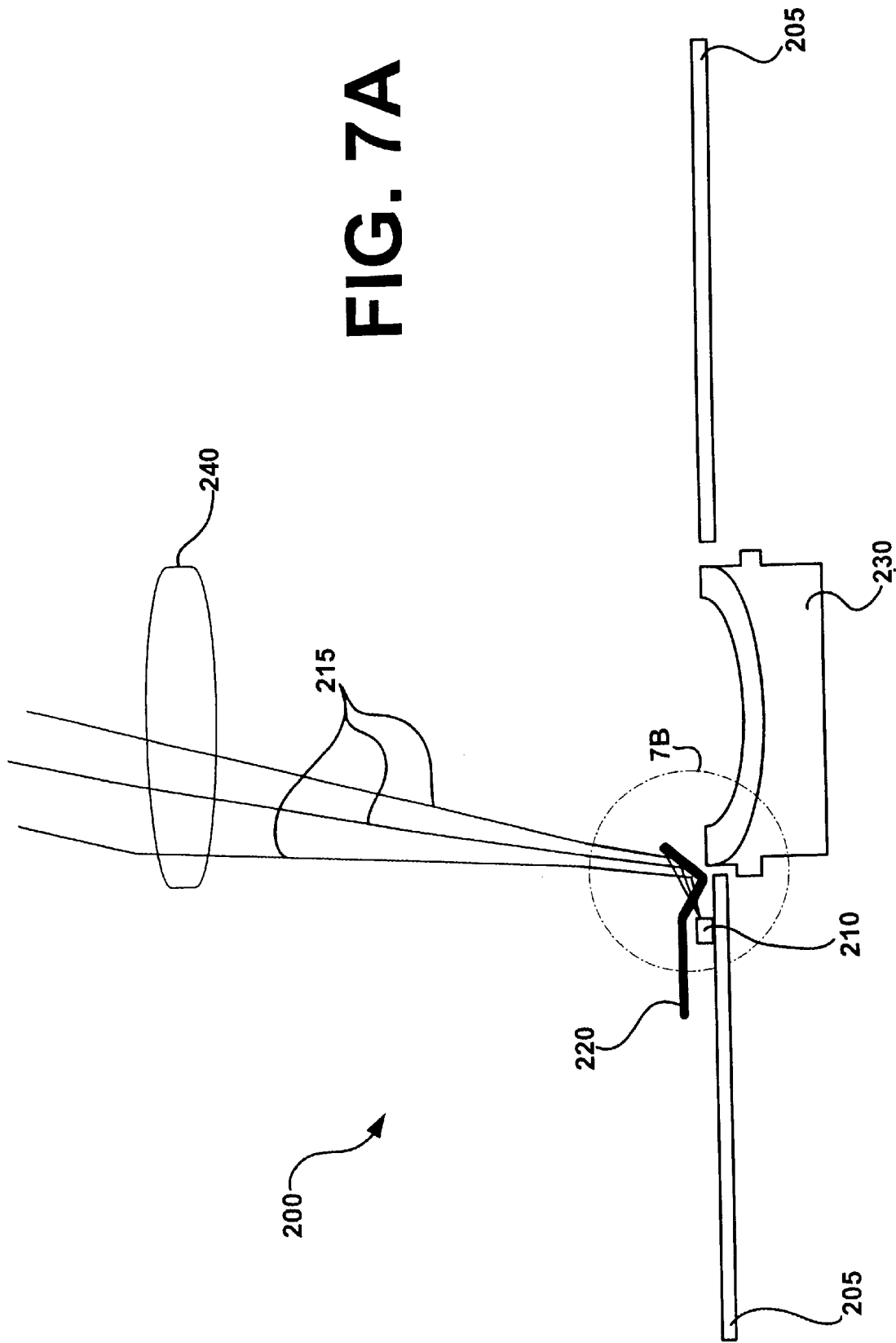

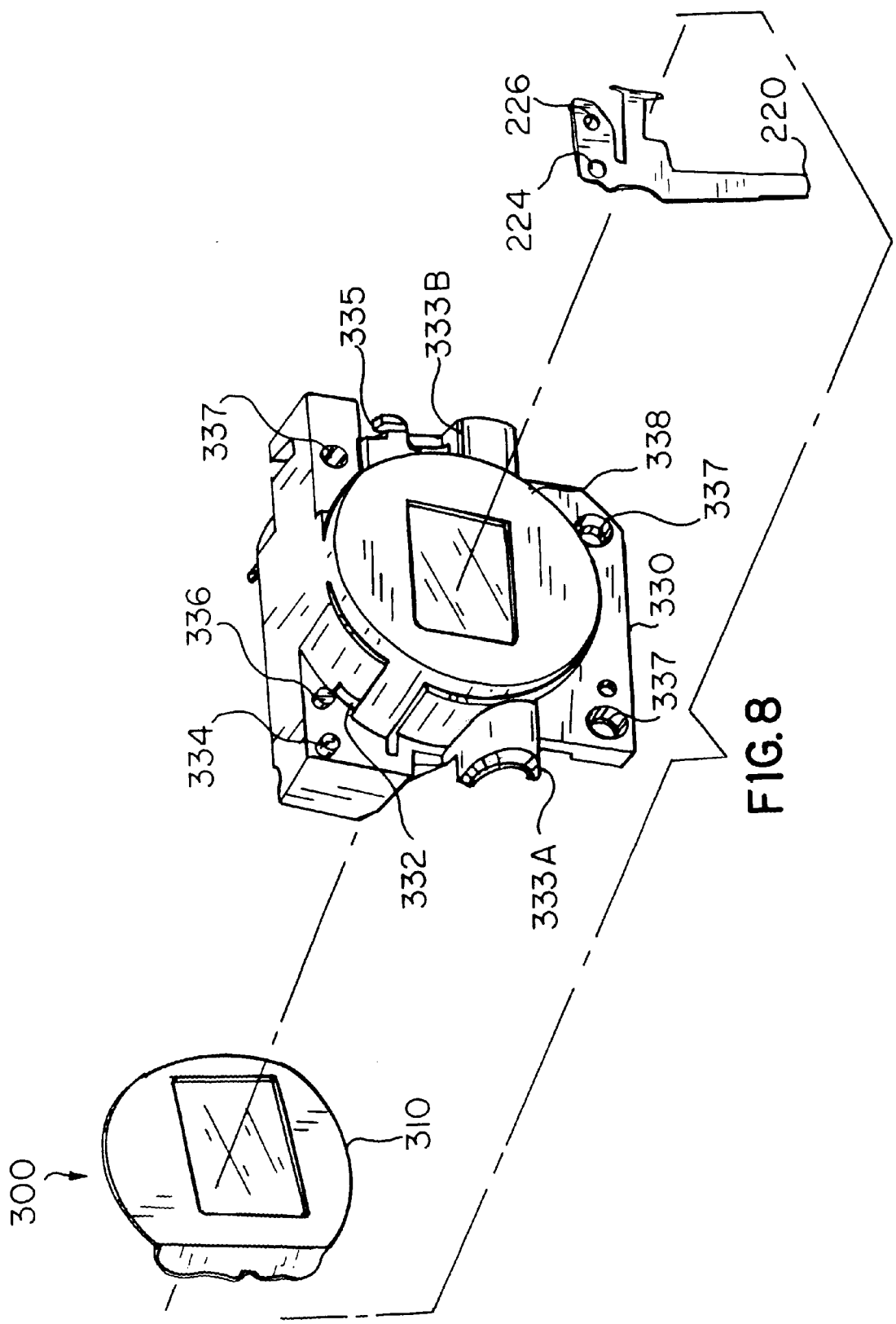

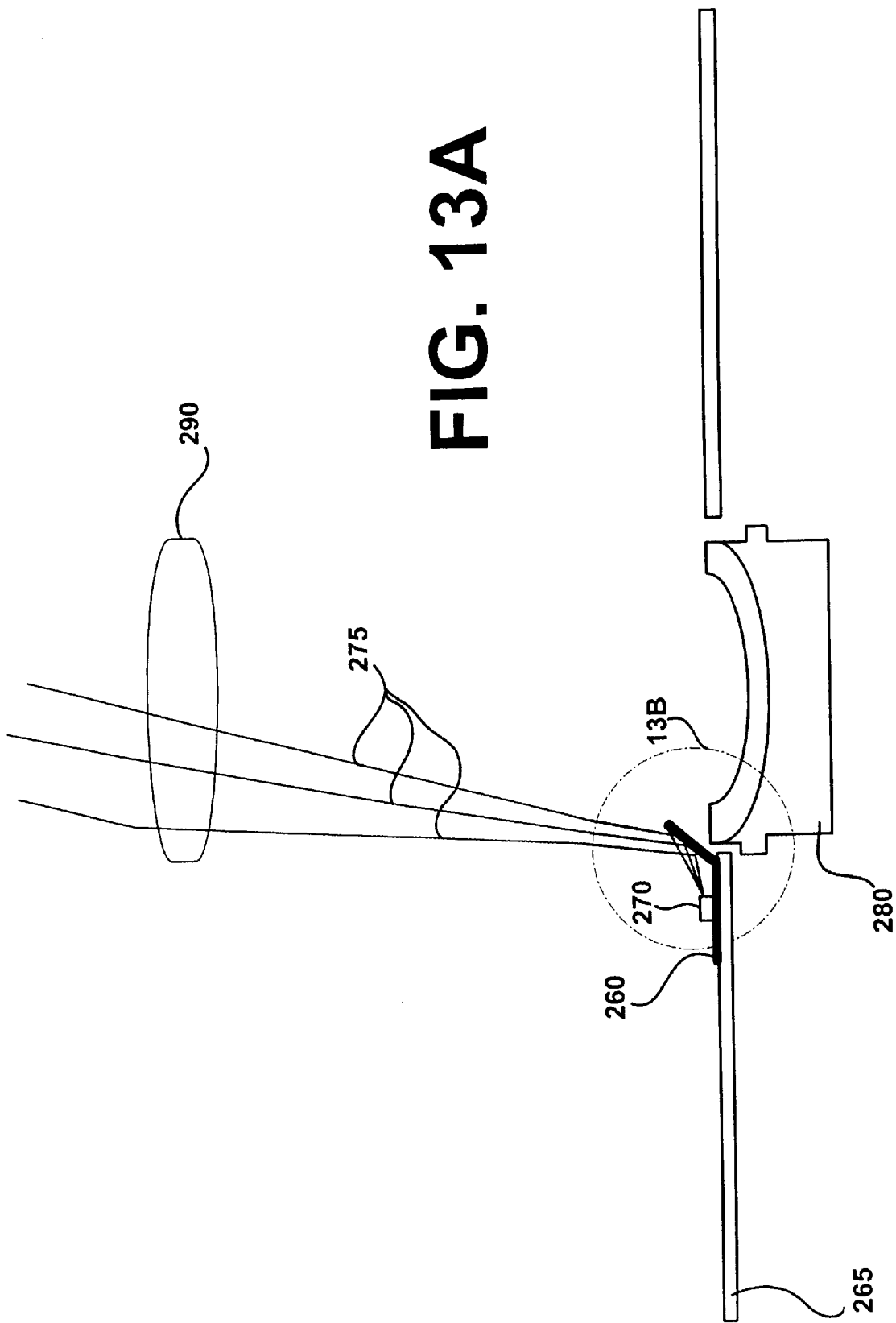

LED REFLECTOR DEVICE

FIELD OF THE INVENTION

The present invention relates to the field of cameras and, more particularly, to a reflector for directing light from an indicator located outside the viewfinder's line-of-sight into the viewfinder.

BACKGROUND OF THE INVENTION

In order to manufacture a compact and low cost camera, it is desirable that all electronic components be surface mounted to the pc-board. To provide an indicator light in the viewfinder, a surface-mount technology (SMT) LED is mounted to the camera pc-board. However, there is no direct line-of-sight from the SMT LED on the pc-board to the line-of-sight of the user using the viewfinder. Traditionally, non-SMT LEDs include a tiny bowl shaped reflector to direct light from the LED substrate. However, there exist LEDs that do not have an internal reflector. Rather, external optical solutions, such as light pipes and/or prisms have been used to direct the light from the LED to the desired viewing area. In a compact camera system using a LED, the addition of a separate light pipe or prism can be cumbersome and costly.

What is needed is an external LED reflector that directs light emitted from the LED into the viewfinder and which is low cost. These objects and others are met with the present invention.

SUMMARY OF THE INVENTION

The present invention is directed to a new and improved camera viewfinder reflector for directing light from an indicator outside the line-of-sight of the viewfinder into the viewfinder. In one embodiment the reflector is combined with an existing element of the camera assembly.

These and other objects and advantages of the present invention will become more readily apparent in the description which follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood, however, that the invention is not limited to the specific methods and instrumentality's disclosed. Additionally, like reference numerals represent like items throughout the drawings. In the drawings:

FIG. 3A shows a top plan view of one particular embodiment of a LED reflector of the present invention.

FIG. 3B shows a side plan view of the LED reflector of FIG. 4A.

FIG. 6A shows a top plan view of a combination reflector and leaf spring in accordance with another embodiment of the present invention.

FIG. 6B shows a side-plan view of the reflector of FIG. 6A.

FIG. 7A shows a side partial view of a portion of the internal camera assembly including a viewfinder and a reflector in accordance with one embodiment of the present invention.

FIG. 8 shows a side perspective exploded view of an exemplary camera viewfinder housing and reflector in accordance-with one embodiment of the present invention.

FIG. 13A shows a side partial view of a portion of the internal camera assembly including a viewfinder and a reflector in accordance with one embodiment of the present invention.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

The present invention is directed towards a new and improved camera reflector for directing the light emitted from an LED disposed outside of a viewfinder into the line-of-sight of the viewfinder. The reflector of the present invention will now be described in connection with an exemplary camera 10 (FIGS. 1 and 2), which, as described herein, is a compact digital camera. However, this is not meant to be limiting. As can be seen from the present description, the reflector of the present invention is useful with any type of camera to direct light from an indicator disposed outside of the viewfinder into the viewfinder.

Figure 1:
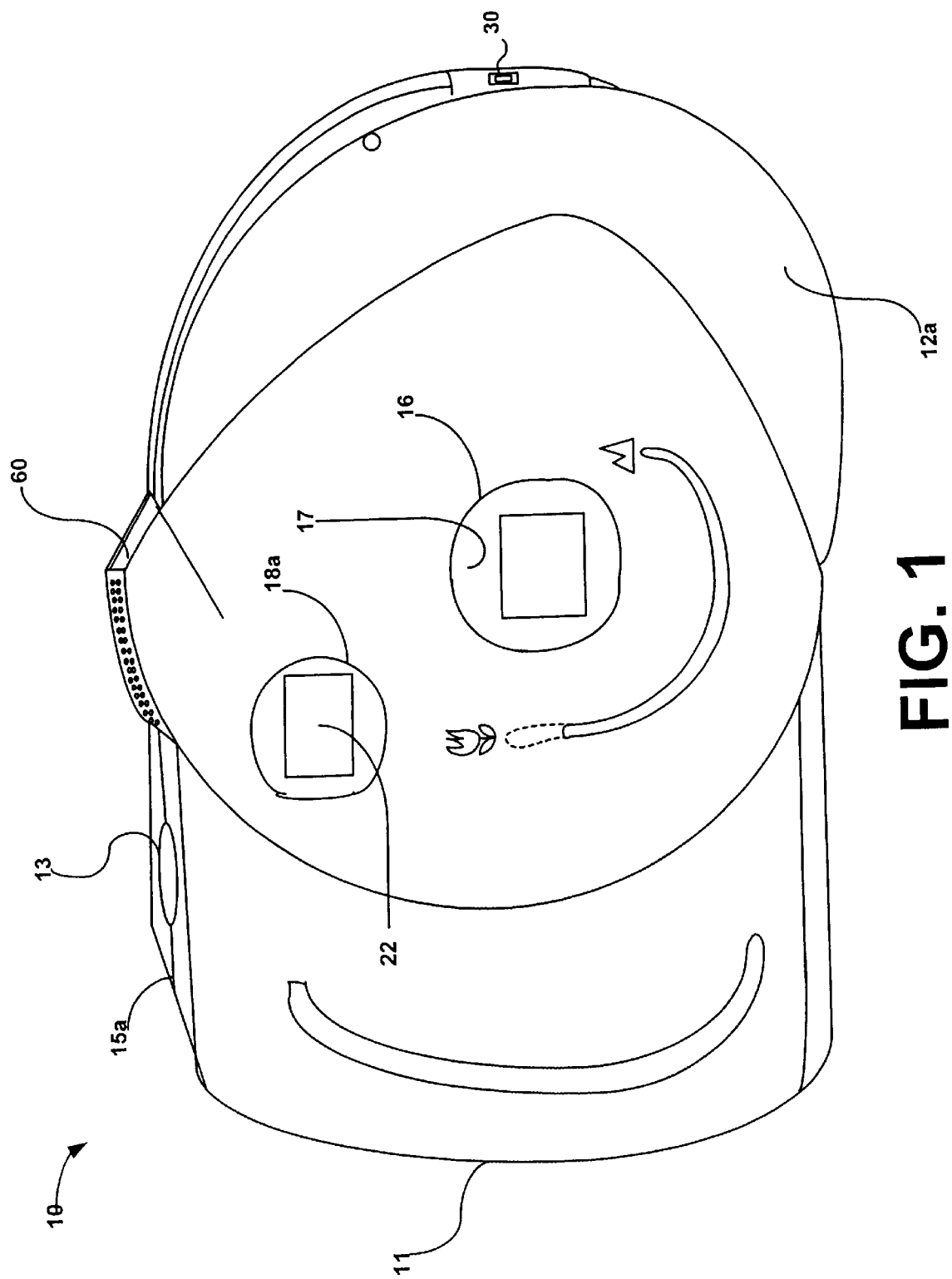
FIG. 1 shows a perspective view from the front, right side of an exemplary camera useful with the present invention.
Figure 2:
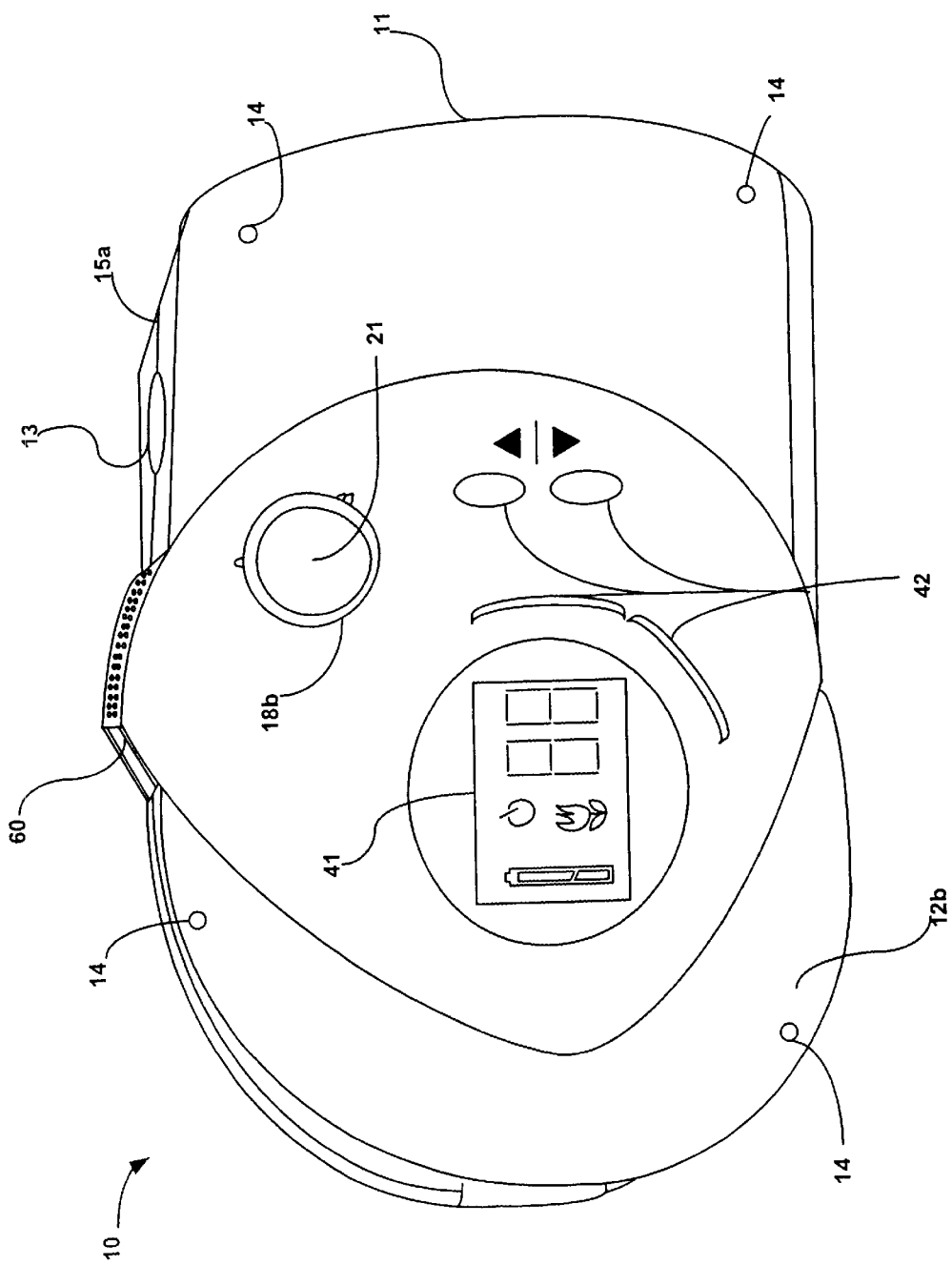
FIG. 2 shows a perspective view from the rear, right side of the camera of FIG. 1.

Referring now to FIGS. 1 and 2, the camera 10 includes an outer housing 11 having a front portion 12a and a back portion 12b. In the present example, the front portion 12a and the back portion 12b are made as two separate pieces to facilitate manufacturing of the housing 11. It should be appreciated, however, that the housing may, alternatively, be comprised of any number of pieces. In a preferred embodiment, the housing 11 is constructed of a lightweight, yet rugged plastic material, but may, alternatively, be constructed of an alloy material, a metallic material or any other suitable material. Additionally, the outer surfaces of the front 12a and back 12b portions may be contoured, if desired, to improve gripping capabilities and provide a more ergonomic and aesthetically pleasing design.

Front portion 12a of housing 11 is adapted for connective engagement with the corresponding back portion 12b using conventional fastening means. The two halves form a substantially light tight connection when assembled together. In this particular example, the front and rear portions 12a and 12b are secured together using screws 14.

The front and back portions 12a, 12b include a plurality of openings integrally formed therein. The openings are structured and disposed to allow access to the objective lens unit (opening 16), the viewfinder assembly (openings 18a and 18b), LCD status display window 40, function select controls 42 and external connector 30.

The objective aperture 16 is disposed within an objective lens optical axis and is adapted for receiving and holding an objective lens cover 17. The objective lens cover 17 is formed of a transparent material such as glass or plastic and may include an opaque portion disposed about its outer perimeter to provide some undesired light shielding capabilities. The objective aperture 16 preferably has a circular shape.

In the present camera 10, a direct line-of-sight through the viewfinder is accommodated by front and rear viewfinder openings 18a, 18b, which are integrally formed in the front and rear housings, respectively. An eye lens optical axis can be defined through the viewfinder apertures 18a and 18b, and correspondingly, through the viewfinder lenses 21 and 22.

A trigger button 13 is accessible through an opening disposed on the top face 15a of the housing 11.

A status indicator opening 40 is provided through the rear housing 12b. A status LCD 41 is visible through the rear housing 12b. Additional openings for a number of user select buttons 42 are disposed in close proximity to the status LCD 41. The number and orientation of the user select buttons 42 may vary to accommodate the particular camera 10 layout. Similarly, the functions provided may vary. Typical function selects include, on/off, timer on/off, etc. Additionally, the status LCD 41 may provide a variety of desired information including timer indication, battery status, number of remaining pictures, mode indicator, etc.

A mirror slide switch 60 is slideably engaged with the top face 15a of the housing 11. The operation of mirror slide switch 60 is described more fully in co-pending-commonly assigned patent application entitled DUAL PURPOSE VIEWFINDER, Ser. No. 10/016,648, filed on even date herewith.

Referring now to FIGS. 3A and 3B, there is shown a reflector 120 in accordance with one embodiment of the present invention. The reflector 120 defines a double reflection path from an indicator device, such as an LED, to the rear viewfinder lens 21. The reflector 120 comprises a reflective material that, in the present embodiment, is stamped as a single piece from a sheet of stainless steel and machine bent to form the different reflective surfaces. However, this is not meant to be limiting. The reflector 120 may be made by other methods, and/or of several pieces. The reflector 120 may further be made using other reflective materials and/or using reflective coatings.

The reflector 120 includes a body 120a, a first reflector section 120b, a light pass section 120c and a second reflector section 120d, each section being separated from the previous section by a bend. Body 120a provides support for the reflector 120 and includes the connector openings 124 and 126 which permit the reflector 120 to be set in the camera 10 in a fixed relationship with the viewfinder and with a LED indicator. Light pass section 120c includes an aperture 122, through which light reflected from the first reflector section 120b passes. Note that although the aperture 122 is shown, other means and designs of light pass section 120c may be employed to permit the light to pass from the first reflector section 120b to the second reflector section 120d.

Figure 4A:
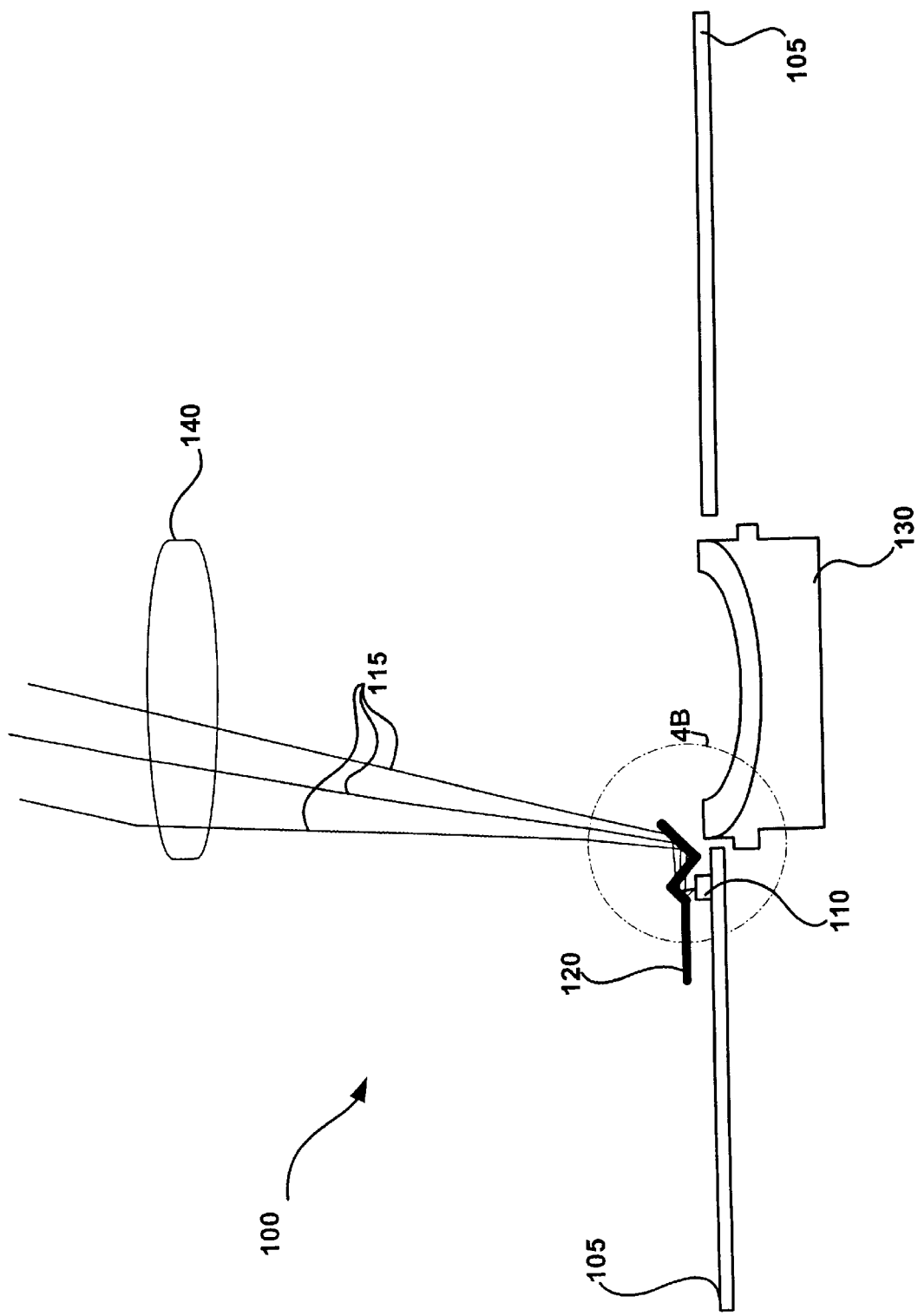
FIG. 4A shows a side partial view of a portion of the internal camera assembly including a viewfinder and a reflector in accordance with one embodiment of the present invention.
Figure 4B:
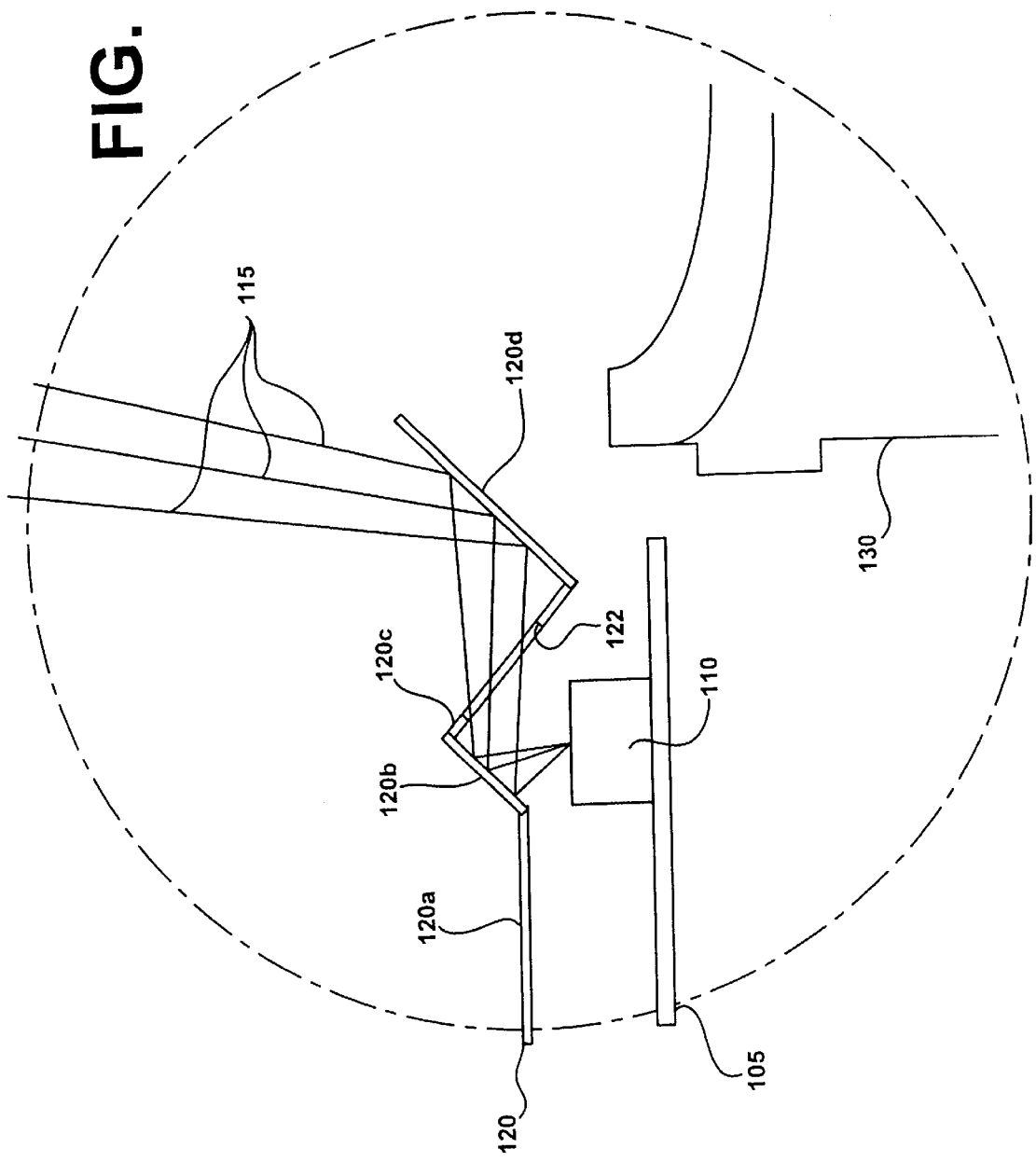
FIG. 4B shows an enlarged view of a portion of the system of FIG. 4A.

Referring now to FIGS. 4A and 4B, there is shown a partial, side cut away view of a camera assembly 100 including a reflector in accordance with one embodiment of the present invention. The camera assembly 100 includes a reverse Galilean viewfinder system, including a negative objective lens 130 and a positive ocular lens 140. During manufacture, a pc-board 105 is fixed around the housing for the negative objective lens 130. The LED 110 is surface mounted to the pc-board 105. The reflector 120 is mounted in a fixed relationship in optical alignment with the positive ocular lens 140 using connector pins or screws (not shown). The connector pins pass through the holes 124 and 126 (FIGS. 3A and 3B) of the reflector 120. Other means for providing the LED reflector 120 in a fixed relationship with the lenses 130 and 140 may be used. The LED reflector 120 is mounted such that the second reflector section 120d is visible at the periphery of the negative objective lens 130, without blocking the line-of-sight through the viewfinder.

In use, when the LED 110 is emitting light, the light 115 is reflected from the bottom surface of the first reflector section 120b, through the aperture 122 of the light pass section 120c to the top surface of the second reflector section 120d and to the ocular lens 140. The LED 110 may be used to provide any desired visual indication to the user, for example, when the camera is first turned on and/or while the digital camera 10 is acquiring new pictures. It can be seen that the reflector 120 of the present embodiments provides an efficient and inexpensive means for directing light from the surface mounted LED into the viewfinder.

In another embodiment of the present invention, to further reduce the cost of the viewfinder assembly, a reflector can be fashioned from an existing component of the camera assembly. For example, camera 10 includes a novel dual-purpose viewfinder assembly that is the subject of the above referenced patent application entitled DUAL PURPOSE VIEWFINDER. The dual-purpose viewfinder of camera 10 includes a leaf spring fixed to the negative lens housing. That leaf spring may be adapted to perform the reflector functions, as will be described herein.

Figure 5B:
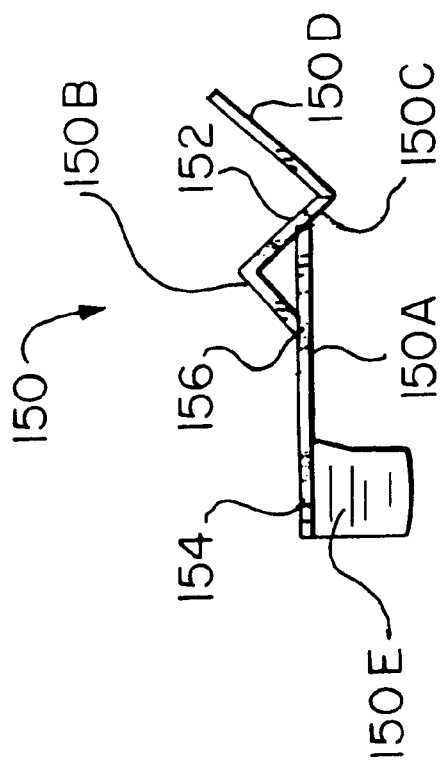
FIG. 5B shows a side plan view of the reflector of FIG. 5A.
Figure 5A:
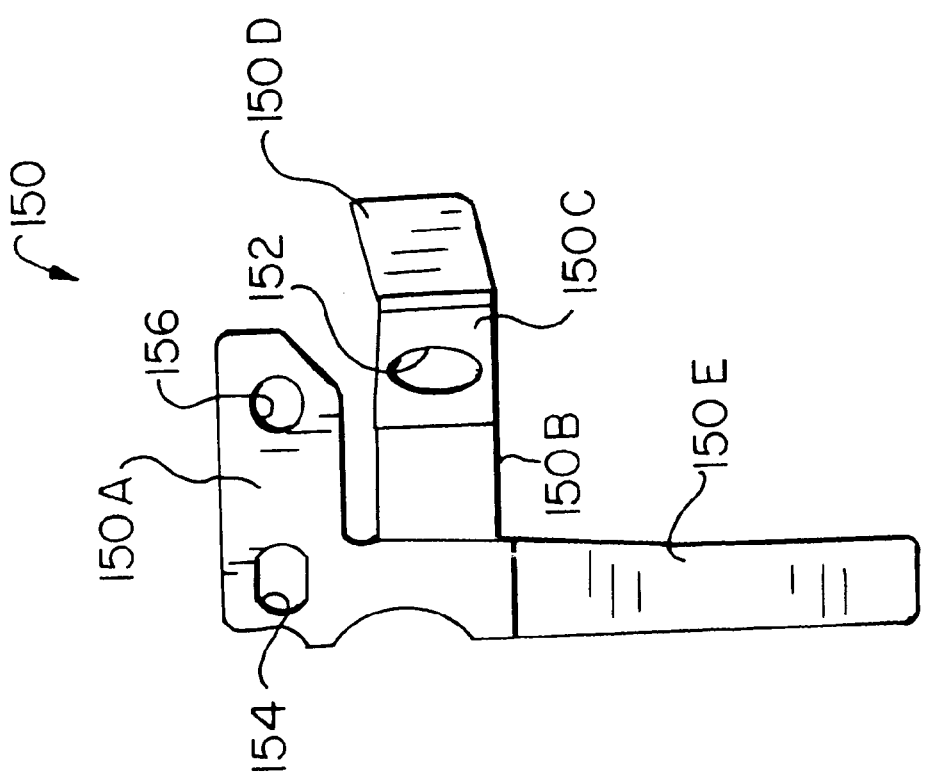
FIG. 5A shows a top plan view of a combination reflector and leaf spring in accordance with one particular embodiment of the present invention.

Referring now to FIGS. 5A and 5B, there is shown a combined leaf spring and reflector 150. As with the reflector 120 (FIGS. 3A and 3B), the body portion 150a includes connector holes 154 and 156. Likewise, the combined leaf spring/reflector 150 is formed of a body 150a, a first reflector section 150b, a light pass section 150c including an aperture 152 and a second reflector section 150d, all sections defined by the bends formed in reflector 150. However, the reflector 150 additionally includes the leaf spring 150e. As described in the co-pending DUAL PURPOSE VIEWFINDER application, leaf spring 150e is used to bias a pivot arm of a flipping mirror in place during operation. Note that although an aperture 152 is shown, other means and designs of light pass section 150c may be employed to permit the light to pass from the first reflector section 150b to the second reflector section 150d.

Referring now to FIGS. 6A and 6B, there is shown a combined leaf spring and reflector 220 in accordance with another embodiment of the present invention. As with the above embodiments, the leaf spring/reflector 220 may be formed as a single piece punched or cut from a sheet of stainless steel or other reflective material. Alternatively, the leaf spring/reflector 220 may be formed by other processes and/or by using several pieces. The combined leaf spring/reflector 220 may additionally be made of other reflective materials and/or using reflective coatings.

The combined leaf spring/reflector 220 of the present embodiment is designed to use light emitted from the side of the LED. As such, only one reflection surface is needed. The leaf spring/reflector 220 includes a body 220a, a light pass section 220b, a reflector section 220c and a leaf spring 220d. The body 220a includes connector holes 224 and 226. The light pass section 220b does not extend the entire height (Y-direction) of the reflector section 220c and functions as a narrow support arm for the reflector section 220c. This permits the light emitted from the side of an LED to pass by the light pass section 220b to the reflector section 220c and to the ocular lens 240, as demonstrated in FIGS. 7A and 7B.

Figure 7B:
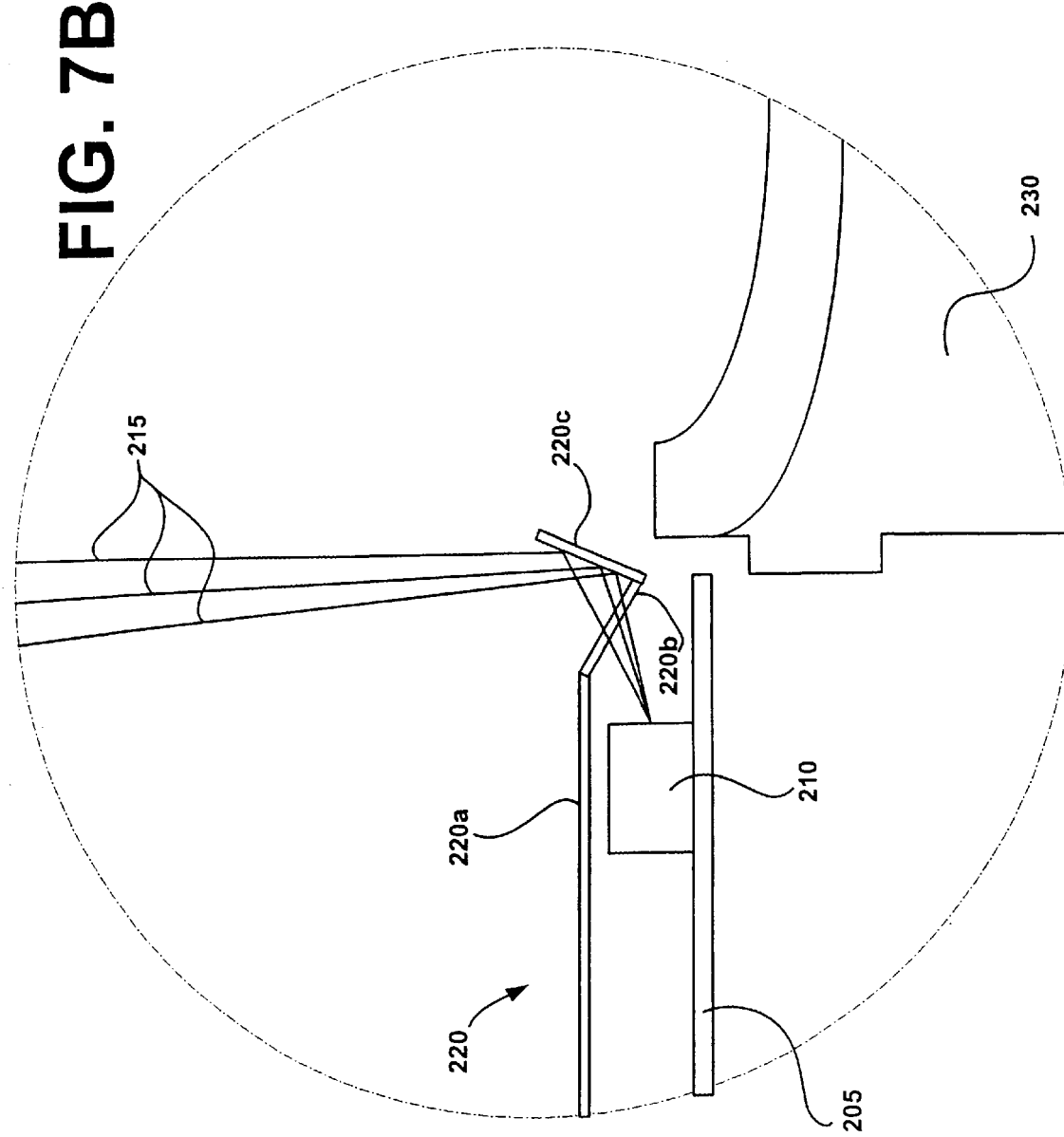
FIG. 7B shows an enlarged view of a portion of the system of FIG. 7A.

Referring now to FIGS. 7A and 7B, there is shown a side cut away view of a camera assembly 200 including a combined leaf spring/reflector 220. The viewfinder assembly 200 is a reverse Galilean viewfinder including a positive ocular lens 240 and a negative objective lens 230. The pc-board 205 surrounds the negative objective lens 230. The SMT LED 210 is surface mounted to the pc-board 205. The combined leaf spring/reflector 220 is mounted in a fixed relationship to the negative objective lens 230 using connector pins or screws (not shown). The connector pins pass through the holes 224 and 226 (FIGS. 6A and 6B) of the combined leaf spring/reflector 220. Other means or providing the combined leaf spring/reflector 220 in a fixed relationship with the lens 230 and 240 may be used. The combined leaf spring/reflector 220 is mounted such that the reflector section 220c is visible at the periphery of the lens 230, without blocking the line-of-sight through the viewfinder.

In use, light emitted from the side of the surface mounted LED 210 is reflected from the top surface of the reflector section 220c to the ocular lens 240 of the viewfinder assembly. In this embodiment, instead of reflecting off multiple surfaces of the reflector 220, light passes from the side of the LED to the reflector section 220c without being obstructed by the narrow light pass section 220b. As the reflector section 220c is fixed in optical alignment with the ocular lens of the viewfinder, light 215 reflected from the reflector section 220c is visible to the user.

Figure 9:
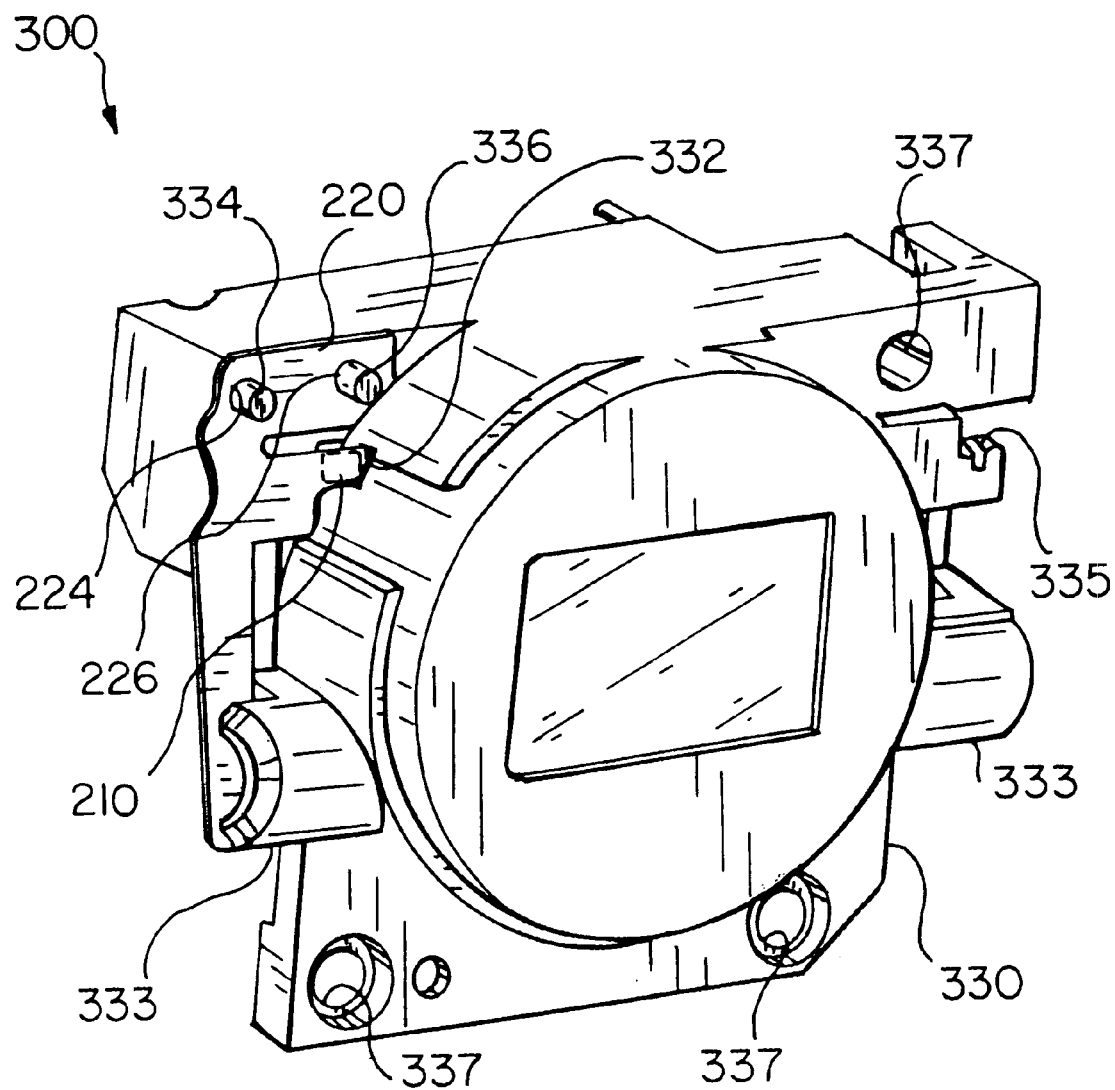
FIG. 9 shows a perspective view from the front left side of an exemplary viewfinder housing and reflector in accordance with one embodiment of the present invention.
Figure 10:
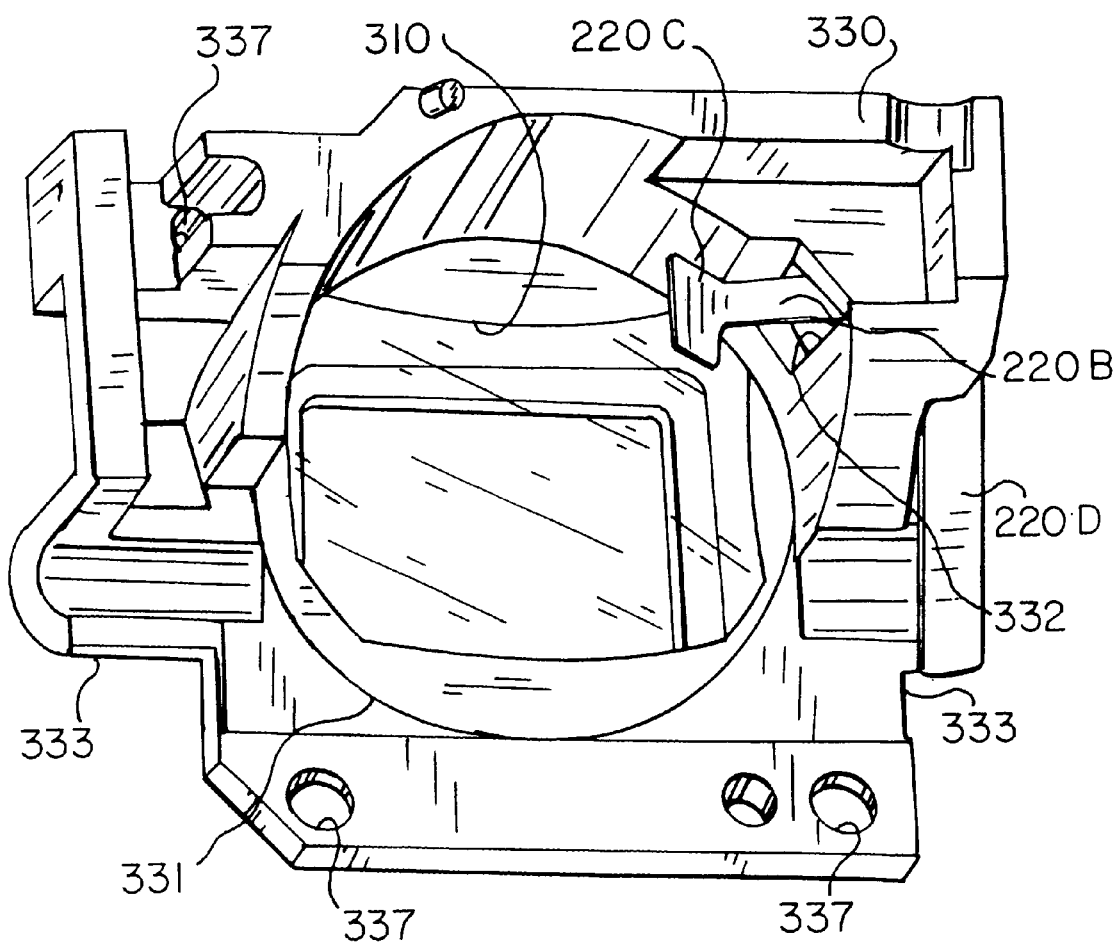
FIG. 10 shows a perspective view from the back side of the exemplary viewfinder housing and reflector of FIG. 8.

Referring now to FIGS. 8–10, there is shown one particular example of a negative lens assembly 300 including the combined leaf spring/reflector 220. Additionally, the negative lens assembly 300 includes the negative lens 310 and a negative lens housing 330. The negative lens housing 330 includes a cavity 331 sized to receive the negative lens 310. Additionally, the negative lens housing 330 includes an opening 332 through the sidewall of the housing 330 to permit a portion of the leaf spring/reflector 220 to pass through the housing. The connector pins 334 and 336 pass through the connector holes 224 and 226 of the reflector, respectively. Note that other means of fixing the combined leaf spring/reflector 220 to the housing 330 may be used.

When assembled, the light pass portion 220b passes through the opening 332 and the reflector section 220c is disposed in front of a portion of the upper right periphery of the negative lens. As such, the reflector section 220c is in fixed optical alignment with the ocular lens without obstructing the view through the viewfinder. The placement of the LED 210 (FIG. 7A) when the pc-board is placed is shown in shadow in FIG. 9. Note that in this particular embodiment, the negative lens housing 330 includes mirror supports 333a and 333b, the purpose of which is described more fully in the above referenced DUAL PURPOSE VIEWFINDER patent application. The leaf spring 220d is used to bias a pivot arm of a mirror (not shown) against the mirror supports 333a when in use. The other mirror pivot arm is maintained in place with a coil spring (additionally not shown) one end of which is connected to groove 335 of the negative lens housing 330. The negative lens housing is connected to the rest of the viewfinder assembly using screws that pass through openings 337. Additionally, the negative lens housing may include an opaque portion 338 disposed about its outer perimeter to provide some undesired light shielding capabilities.

Figure 11A:
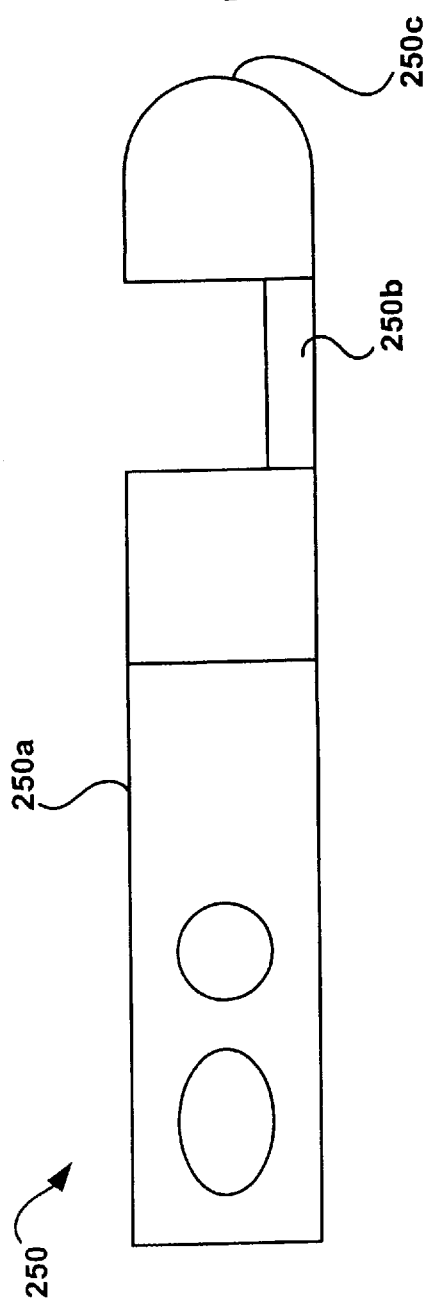
FIG. 11A shows a top plan view of a reflector in accordance with one particular embodiment of the present invention.
Figure 11B:
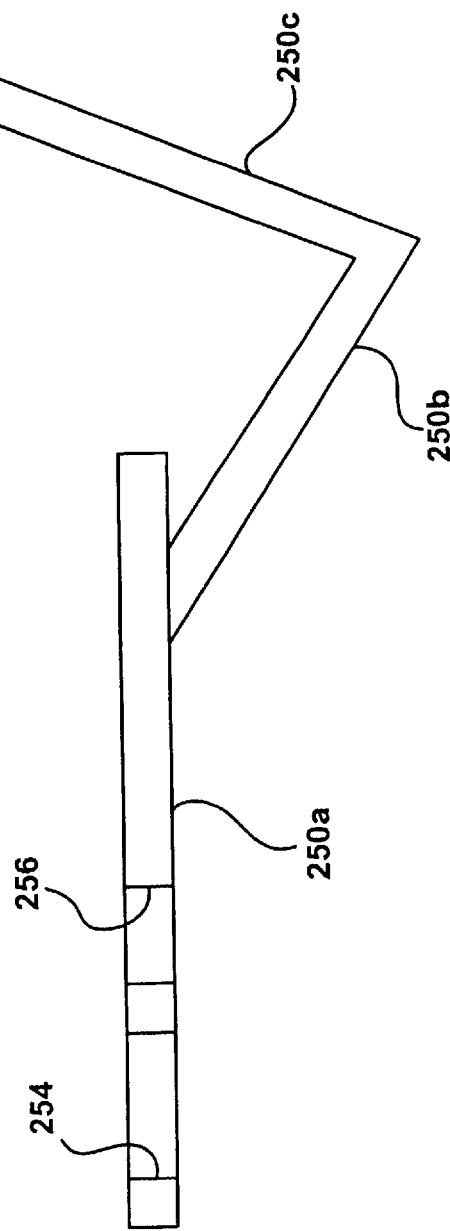
FIG. 11B shows a side plan view of the reflector-of FIG. 11.

Note that other forms of LED reflectors may be used and still be in accordance with the objectives of the present invention. For example, FIGS. 11A and 11B show another embodiment of a LED reflector 250 in accordance with the objectives of the present invention. The reflector 250 is of the single reflection type and includes a body 250a, a light pass section 250b and a reflector section 250c. It can be seen how the reflector 250 can be used in place of the combined leaf spring/reflector 220 in FIGS. 8–11, if it is desired to omit the leaf spring.

Figure 12A:
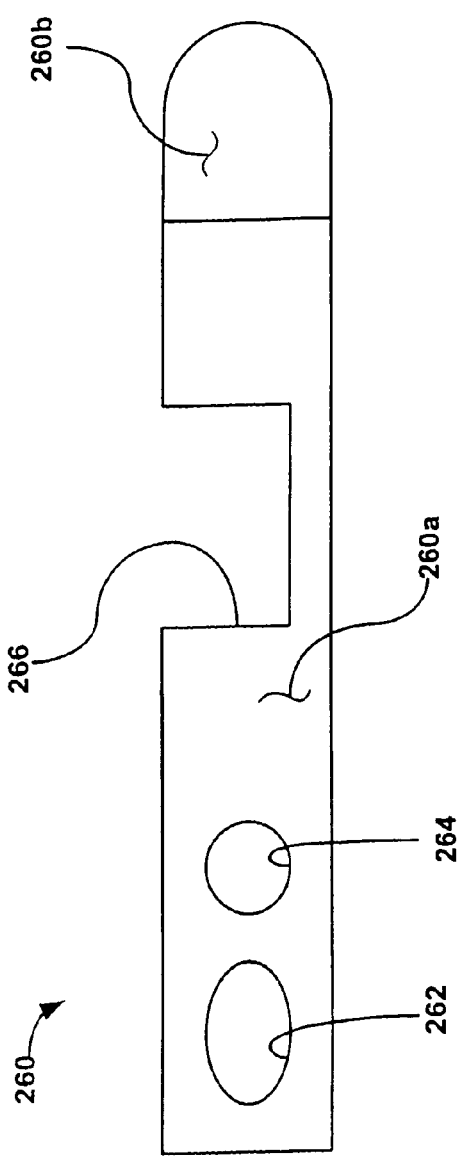
FIG. 12A shows a top plan view of a reflector in accordance with one particular embodiment of the present invention.
Figure 12B:
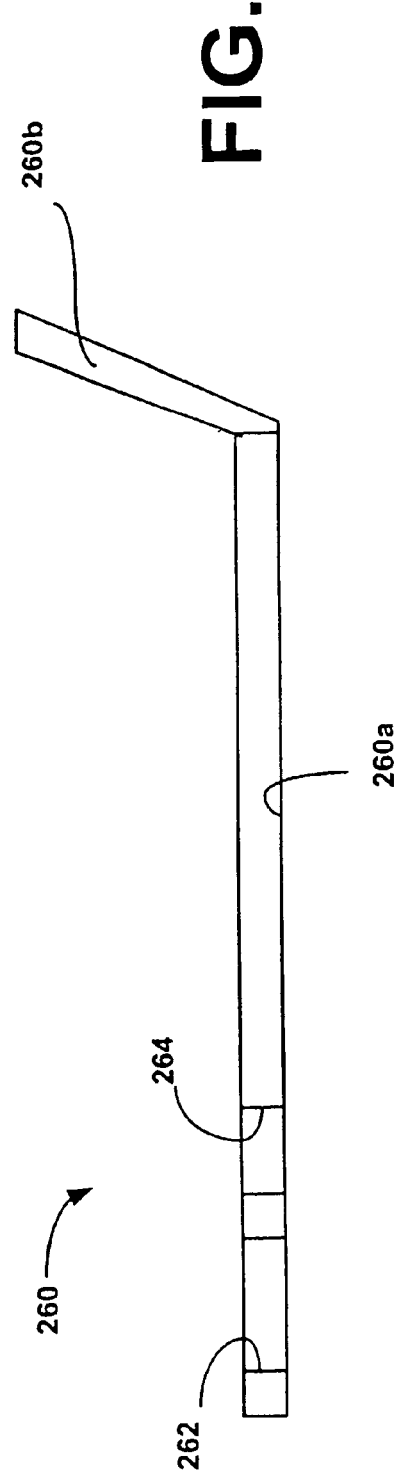
FIG. 12B shows a side plan view of the reflector of FIG. 12A.
Figure 13B:
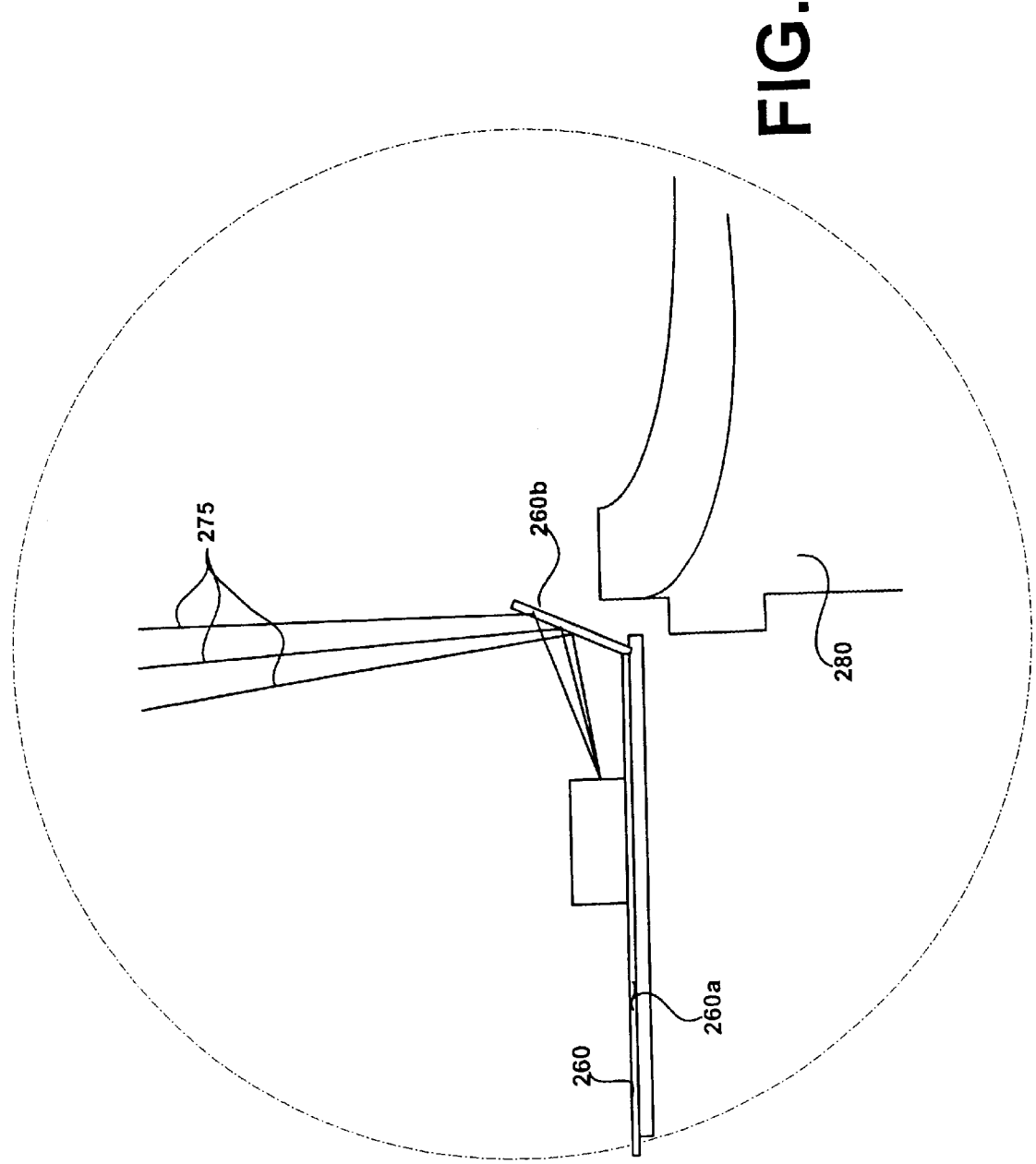
FIG. 13B shows an enlarged view of a portion of FIG. 13A.

Further, FIGS. 12A–12B show yet another embodiment of a reflector which may be used in accordance with the present invention. Referring now to FIGS. 12A–13B, there is shown a reflector 260 including only a body portion 260a and a reflector section 260b. Note that the body section 260a includes optional connector openings 262 for connecting the reflector 260 to the pc-board and 264, alternatively, the body section 260a may be adhesively fixed or soldered to the pc-board. The body 260a contains a cutout portion 266 which surrounds the LED 270 on the pc-board 265. The reflector body portion 260a has a lesser height than the LED 270, thus permitting the light emitted from the side of the LED 270 to pass to the reflector section 260b. The reflector 260 may be stamped from a thin sheet of reflective material such as a heavy weight foil, or a thin sheet of aluminum or stainless steel. Alternatively, it can be seen that other reflective materials and/or coatings may be used. The reflector section 260b shall be angled and shall be long enough to extend into the line of sight of the viewfinder assembly, such as through aperture 332 of FIGS. 8–10. As with the earlier described embodiments, a portion of the reflector section 260b is disposed at the periphery of the ocular lens 290, such that it is located in a fixed optical alignment with the ocular lens 290 without obstructing the line-of-sight through the viewfinder. As such, light 275 reflected from the reflector section 260b will be visible at the ocular lens 290 of the camera viewfinder.

while the invention has been described with reference to certain embodiments, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A camera, comprising:
   a viewfinder assembly including a first objective lens and a second ocular lens, said second ocular lens disposed in optical alignment with said first objective lens;
   a visual indicator located outside of said viewfinder assembly;
   a reflector formed from a sheet of reflective material including a body section and at least one reflective section, wherein said body section is fixed to a portion of the camera outside said viewfinder assembly and wherein at least a portion of said reflective section extends into said viewfinder assembly in optical alignment with said second ocular lens, wherein said reflective section is angled away from said body section so as to be located in a different plane than said body section; and
   wherein light from said indicator is reflected from said reflective section to said ocular lens.

2. The camera of claim 1, wherein said visual indicator is an LED.

3. The camera of claim 2, wherein said LED is a surface mounted LED.

4. The camera of claim 3, wherein said reflector further includes at least a light pass section integral with and located between said body section and said at least one reflective section, wherein light from said LED passes said light pass section to said reflective section.

5. The camera of claim 4, wherein said reflector further includes at least a first reflector portion, wherein light from said LED is reflected from said first reflector portion, past said light pass section and to said reflective section.

6. The camera of claim 4, wherein said first lens and said second lens are part of a reverse Galilean viewfinder assembly.

7. The camera of claim 4, wherein said light pass section includes an opening through which light from said LED passes.

8. The camera of claim 4, wherein said light pass section has a width less than the width of said reflective section which permits light to pass said light pass section of said reflector to said reflective section.

9. The camera of claim 1, wherein said reflector further includes at least a light pass section located between said body section and said reflective section, wherein light from said indicator passes said light pass section to said reflective section.

10. The camera of claim 9, wherein said reflector further includes at least a first reflector portion, wherein light from said indicator is reflected from said first reflector portion, past said light pass section to said reflective section.

11. A reflector for directing light from a remote indicator into a viewfinder of a camera, the reflector comprising:
    a body portion for mounting the reflector in the camera in fixed relation to the viewfinder, said body portion being mounted outside the viewfinder;
    a light pass section;
    a reflective section intergral with said body portion said light pass section, at least a portion of said reflective section extending into said viewfinder and being in optical alignment with an ocular lens of the viewfinder, said reflective section including a reflection surface for reflective light into the viewfinder; and
    wherein said reflective section is angled away from said light pass section and said body portion as to be located in a different plane from said light pass section and said body portion,
    wherein said reflector is formed from a sheet of reflective material.

12. The reflector of claim 11, wherein light from the remote indicator passes said light pass section to said reflective section.

13. The reflector of claim 12, wherein the indicator is a surface mounted LED.

14. The reflector of claim 13, wherein said light pass section includes an opening therethrough, said opening permitting light from said LED to pass to said reflective section.

15. The reflector of claim 13, wherein at least a portion of said light pass section has a width less than the width of said reflective section, wherein said reduced width section permits light from said LED to pass to said reflective section.

16. The reflector of claim 15, wherein said reflector is combined with an additional component of the camera.

17. The reflector of claim 16, wherein said reflector is additionally a leaf spring.

18. The reflector of claim 13, additionally including a first reflector section, wherein light from said LED is reflected from said first reflector section, past said light pass section and to said reflective section.

19. The reflector of claim 18, wherein said reflector is additionally a leaf spring.

20. A method of directing light from an indicator into the viewfinder of a camera, comprising the steps of:
    (a) providing a camera, including:
        a viewfinder assembly including a first objective lens and a second ocular lens, said first and said second lenses being in optical alignment;
        a visual indicator located outside said viewfinder;
        a reflector formed from a sheet of reflective material including a body section and a reflective section, said body section being fixed to a portion of the camera outside said viewfinder assembly, wherein said reflective section is angled away from said body section so as to be located in a different plane than said body section, and wherein at least a portion of said reflective section extending into said viewfinder assembly and being located in optical alignment with said second ocular lens;
    (b) activating said visual indicator to provide a visual signal outside the viewfinder; and
    (c) reflecting said visual signal from said reflective section to said second ocular lens.

21. The method of claim 20, wherein said reflector further includes a light pass section integral with and located between said body section and said reflective section, said light pass section and said reflective section being angled from each other so as to be located in a different plane from each other and from said body section.

22. The method of claim 21, wherein said visual signal is reflected past said light pass section to said reflective section.

23. The method of claim 22, wherein said reflector further includes at least a first reflector section.

24. The method of claim 23, including the step of reflecting said visual signal off said first reflector section and past said light pass section in order to reflect said visual signal from said reflective section.

25. The method of claim 22, wherein said visual indicator is a surface mounted LED.

26. The method of claim 25, wherein said reflector is additionally a leaf spring.

* * * * *